3,222,423
**METHOD OF INCREASING GRAFTING EFFI-
CIENCY IN GRAFT COPOLYMERIZATION**
David Samuel Petrie Roebuck, Newport, England, assignor to Monsanto Chemicals Limited, London, England, a British company
No Drawing. Filed Nov. 15, 1961, Ser. No. 152,653
11 Claims. (Cl. 260—877)

This application is a continuation-in-part of my copending application S.N. 720,085, filed March 10, 1958, now abandoned.

The invention relates to a process for preparing graft copolymers and more particularly relates to a method of increasing grafting efficiency in a graft copolymerization reaction.

When a polymerizable monovinyl compound, e.g., styrene, is caused to undergo radical-addition polymerization using a suitable initiator, e.g., a persalt or a peroxide, the polymerization proceeds with the formation of linear polymer molecules and the progressive elimination of unsaturation. Depending upon the reagents and conditions, a certain amount of chain transfer of a terminal radical to a carbon atom of a polymer chain already formed, as well as activation of sites on the formed polymer, may occur, leading to the production of side chains or branches on the polymer molecule. A polymer with side chains or branches can also be obtained by employing in the polymerization suitable small proportions of a substance which has two or more potentially active centers through which polymerization can take place, e.g., divinylbenzene. When two different monovinyl compounds, e.g., styrene and acrylonitrile, are together made to undergo polymerization, copolymers are obtained in which the monomer units are (except in certain special cases in which alternation occurs) more or less randomly distributed along a chain, and again branching may occur by chain transfer. The extent to which this transfer occurs depends upon a number of factors, one of which is the temperature at which the polymerization is conducted.

If a monomer is polymerized in the presence of a preformed polymer derived from the same monomer or from a different monomer or monomers, then polymer is formed from the monomer independently of the preformed polymer. When conditions are suitable for the occurrence of chain transfer to the preformed polymer or for activation of sites on the preformed polymer by the initiator used, growth of side chains formed from the monomer is initiated at the active centers on the preformed polymer chain thus produced. In this way the new polymer side chains become grafted onto the trunk (or backbone) of the preformed polymer to form a type of polymer known as a graft copolymer. The graft copolymer is contaminated by homopolymer formed by independent polymerization of the monomer.

The present invention is concerned with a graft copolymerization process in which a chemical polymerization initiator is used to induce active centers in the trunk of a material and these centers are then used as sites on which a monomer is graft copolymerized. By this means, branches (or side chains) are introduced onto a trunk of the same or some other polymer.

It has been discovered that if a polymer which has been dispersed in a suitable medium in the form of a dispersion is treated with a chemical polymerization initiator under conditions in which active centers are induced, then many of these active centers remain after the initiator is used up (or loses its activity), and a monomer which undergoes radical-addition polymerization can be introduced into the dispersion and graft copolymerized onto each pretreated trunk polymer containing active centers, with the development of branches. These branches continue to grow as long as unpolymerized monomer is available and the active centers, transferred from one molecule of monomer to the next as a branch progressively lengthens, are not destroyed by some chain-stopping material. The invention accordingly provides a method of introducing into a trunk material a number of branches which are substantially linear apart from any modification of structure which is caused by chain transfer reactions (and, of course, apart from substituent groups, such as phenyl, which are derived from the monomer used), and greater variation and control of the properties in a graft copolymer can be obtained by the process than if a monomer is polymerized with an initiator in the presence of a trunk polymer, as in the earlier processes described above.

The new grafting process can be carried out at room temperature. This is an advantage, since chain-transfer reactions are minimized by avoiding the use of elevated temperatures. Hence, by using the process now discovered, the conversion of monomer to homopolymer arising from transfer of active centers to monomer can be avoided and it can be arranged that substantially all monomer polymerizes to form branches initiated from active centers on the trunk polymer. Since both the starting material to be treated with the initiator and the graft copolymer product are in dispersed form, they are easily handled and the product is readily convertible into any physical form required for use. Excellent results are obtained with starting materials which are aqueous dispersions of polymers produced by suspension polymerization and, particularly, by emulsion polymerization. Since the active centers are situated on large polymer molecules in dispersed particules, they cannot migrate from particle to particle. Moreover, since the individual particles are of a sufficiently viscous nature (generally they are in fact solid) to inhibit free migration of radicals within individual particles, termination of polymerization by mutual destruction of radicals is hindered. It is therefore possible to control the size of the grafted branches by controlling the amount of available monomer or the time allowed for reaction.

The new process can be carried out using as starting materials, not only dispersible organic polymers of the type which contain carbon-hydrogen bonds and in which suitable treatment with a chemical polymerization initiator induces active sites at which polymer-grafting can take place, but also similar long-chain organic materials of this type.

Accordingly, the process of the invention is one for the preparation of a graft copolymer in which a dispersion of a long-chain organic material containing carbon-hydrogen bonds is treated with a chemical polymerization initiator such that active centers are induced in the trunk of the material, and a monomer capable of radical-addition polymerization is then introduced and graft copolymerized onto the active centers to form branches.

Suitable as organic materials upon the trunk of which the graft copolymerization can be carried out are hydrocarbon and substituted hydrocarbon polymers containing long carbon chains and capable of forming active centers when treated with a chemical polymerization initiator. Such polymers are those derived by the polymerization or copolymerization of vinylidene compounds, such as alpha-olefins (e.g., ethylene, propylene, etc) monovinylidene aromatic hydrocarbons (e.g., styrene, alpha-methyl-styrene, o-, m-, and p-methylstyrenes, other ar-alkylstyrenes, etc.), acrylonitrile, methacrylonitrile, alkyl methacrylates (e.g., methyl methacrylate, ethyl methacrylate, propyl methacrylate, butyl methacrylate, etc.), the corresponding alkyl acrylates, conjugated 1,3-dienes (e.g., butadiene, isoprene, etc.). Both rubbery polymers, e.g., butadiene-styrene rubbers of the GR–S type, and resinous polymers, e.g., styrene-butadiene copolymers of high styrene content, are utilizable.

Also utilizable are polymers in which oxygen or nitrogen is interposed in the carbon chain of the polymer. Exemplary of such polymers are polyamides, such as polyhexamethylene adipamide, and polyesters, such as the polyester derived from ethylene glycol and terephthalic acid. Examples of other organic materials which can be used are paraffin wax, proteins, and natural rubber. Polymers containing side chains or cross-linked chains can be used if desired, including graft copolymers which have already been obtained by the process of the invention.

The dispersion medium and any materials contained in it besides the trunk material onto which grafting is to take place need, of course, to be free of chain-stopping materials which will destroy the active centers as they are produced by the treatment with the polymerization initiator. Thus substances having anitoxidant properties should be excluded. Oxygen also is best excluded, for it can stop the active centers by forming peroxide groups, and it will be seen that oxygen is rigidly excluded in the examples given later in this specification. The dispersion medium is usually water, for this normally has the requisite properties: most polymers are insoluble in it, and it does not stop polymerization by destroying active centers at which radical-addition polymerization can take place. Other dispersion media can be used in any circumstances in which they have the necessary properties.

The dispersion will need to contain a suitable dispersing agent, which should be free of any groups which would interfere with the polymerization by destroying active centers. Dispersing agents which contain ethylenic linkages, e.g., should preferably not be used. Alkali metal salts of saturated fatty acids, e.g., sodium palmitate, sodium stearate, and other saturated soaps, can be used; common soap is suitable. Alkali metal salts of alkyl hydrogen sulfates and alkali metal alkylaryl sulfonates can also be employed. Dispersing agents, which act by increasing the density of the dispersion media can also be used, e.g., soluble salts or soluble high molecular weight bodies. Sufficient dispersing agent should be used to form a stable dispersion. The dispersion needs also to be of sufficiently low viscosity for the monomer which is added for grafting to beeasily distributed through it. As already indicated, it is very convenient to use a dispersion which has been prepared by emulsion polymerization of a suitable vinylidene monomer or monomer mixture.

A wide variety of chemical polymerization initiators can be used for inducing the active centers in the dispersed organic material, peroxy compounds being particularly useful. In the practice of the invention, an initiator may merely be used in such an amount and at such a temperature that by the time the active centers have been induced substantially all the initiator has been used up; e.g., a peroxy compound, such as a per-salt, can be used in this way at an elevated temperature, such as 75° C. Specific peroxy compounds that can be employed are potassium persulfate and t-butyl peracetate. There are also certain very effective initiators which decompose easily even at rather low temperatures and thus permit the treatment to be carried out at, e.g., 20° C. In either event sufficient time is normally allowed to elapse for the initiator substantially to decompose after the active centers have been induced, and the monomer to be grafted onto the active centers is then added. Nonetheless if the presence of a small proportion of homopolymer is unobjectionable, some of the initiator can still be present when the monomer is introduced. Examples of groups of initiators that work at relatively low temperatures and decompose rapidly are redox-type bodies, e.g., a peroxy compound used in conjuction with an inorganic or organic substance having reducing properties, or a hydroperoxide, such as t-butyl hydroperoxide, used in conjunction with a polyamine. Specific examples of redox-type initiators in the first category are potassium persulfate-sodium bisulfite, potassium persulfate-sodium thiosulfate, and ferrous pyrophosphate-fructose-hydrogen peroxide mixtures.

Alternatively an initiator can be chosen which is effective at a certain temperature (usually an elevated one) and which can be made at least virtually inactive by reducing the temperature. Then the organic material can be treated with the initiator at the higher temperature to induce active centers and then cooled to the lower temperature at which the initiator, although still present, is in an inactive form before the monomer is introduced. Thus certain peroxy compounds, e.g., a persulfate such as potassium persulfate, become operative as initiators above about 50° C. but can be made inactive by cooling to a temperature as low as say 20° C.

The nature and amount of the chemical polymerization initiator used will depend on many factors, including the nature of the organic starting material and the properties which are desired for the final graft copolymer. In general the greater amount of initiator the larger will be the number of active centers produced and the larger will be the number of branches grafted onto the trunk. Too great an amount of initiator should be avoided if cross-linking is undesirable, as this may be aided by the presence of a very large number of active centers. However, in practice no difficulty is experienced in choosing a suitable quantity of initiator in any particular instance: at the worst no more than a few simple comparative tests have to be performed. In many cases satisfactory results can be obtained using 0.1–2%, particularly about 1%, by weight of the initiator, based on the weight of the organic starting material.

Free radical-polymerizable monomers which can be used in the process are vinylidene compounds, such as monovinylidene aromatic hydrocarbons (e.g., styrene, alpha-methylstyrene, o-, m-, and p-methylstyrenes, other ar-alkylstyrenes, etc.), conjugated 1,3-dienes (e.g., butadiene, isoprene, etc.), acrylontrile, methacrylonitrile, vinyl halides (e.g., vinyl chloride, vinyl fluoride, etc.), vinyl esters of alkanoic acids (e.g., vinyl acetate, vinyl propionate, vinyl stearate, etc.), alkyl methacrylates (e.g., methyl methacrylate, ethyl methacrylate, propyl methacrylate, butyl methacrylate, etc.), the corresponding alkyl acrylates, and mixtures thereof. The monomer can be added directly to the dispersion of the material that has been treated with the initiator, and the dispersion agitated to obtain adequate distribution of monomer among the polymer particles, after which the agitation can be continued while the monomer is allowed to undergo graft copolymerization. It is sometimes convenient to emulsify the monomer in water (or other dispersing medium used) with the aid of a suitable emulsifying agent and to mix the emulsion of monomer with the treated polymer dispersion.

The presence of air during the grafting process is preferably avoided, because oxygen can intervene in the polymerization by acting as a chain-stopper and thus bring the growth of branches to a halt. After addition of the monomer the graft copolymerization is allowed to proceed as far as is desired, and it can be terminated at any point by the addition of a chain-stopping material, e.g., hydroquinone or a salt of dimethyl or diethyl dithiocarbamic acid. The reaction can, if desired, be allowed to proceed until all added monomer has been used up and then continued with the addition of a second monomer.

When the graft copolymerization process has been completed, the dispersion can be used as a coating composition, with the addition of other materials if desired, by applying it to a surface which is to be coated with polymer and allowing it to dry. Alternatively, it can be coagulated to give the graft copolymer in solid form, e.g., for molding operations.

The invention is illustrated by the following examples.

*Example 1*

This example describes the graft copolymerization of styrene onto a styrene-butadiene copolymer having a high styrene content. The styrene-butadiene copolymer used was one obtained by the emulsion polymerization in an atmosphere of nitrogen of styrene (85 parts by weight) and butadiene (15 parts) in water (230 parts) using common soap (4 parts) as the dispersing agent and potassium persulfate (0.1 part) as the catalyst. This dispersion of styrene-butadiene copolymer had a 31% solids content.

A 201.6 gram portion of the dispersion and 5.1 grams of an aqueous solution of potassium persulfate containing 0.0562 gram of potassium persulfate were each deoxygenated by bubbling nitrogen through the solutions and were then placed in a bottle. Air in the bottle was replaced by nitrogen at a pressure of 2 atmospheres. The bottle was capped with a self-sealing rubber gasket, and the bottle was agitated in an end-over-end tumbler (14 revolutions/minute) for 16 hours at 50° C. and then cooled to room temperature (20° C.). The styrene-butadiene copolymer contained active centers which had been induced by the potassium persulfate at 50° C.

4.9 grams of a deoxygenated aqueous solution of Dispersol T containing 0.5 gram of Dispersol T (the sodium salt of methylene dinaphthalene sulfonic acid) were added to the contents of the bottle together with 22.5 grams of deoxygenated styrene, and the bottle was agitated again in the tumbler for 48 hours but at a lower temperature, 20° C., in which circumstances the potassium persulfate was inactive as an initiator of active centers.

At the end of this time a weighed sample was taken using a syringe, hydroquinone added as polymerization inhibitor, and placed in an open dish which was then heated in an oven at 110° C. for 45 minutes (to drive off water and unchanged monomer) and finally weighed. By this means the solids content of the final dispersion was determined, and from this it was found by calculation that 37% of the added styrene monomer had grafted onto the trunk copolymer. A sample taken after the mixture had been agitated for 72 hours showed a conversion of 51%.

*Example 2*

The graft copolymerization described in Example 1 was repeated but using varying proportions of the potassium persulfate initiator. The actual quantities (in grams) of the various components used and the results obtained are given below.

| Run | 1 | 2 | 3 |
|---|---|---|---|
| Copolymer dispersion | 201.9 | 202.4 | 200.6 |
| Potassium persulfate (added as ca. 4% aqueous solution) | 0.101 | 0.206 | 0.420 |
| Dispersol T (added as ca. 10% aqueous solution) | 0.72 | 0.70 | 0.71 |
| Styrene | 23.3 | 22.8 | 22.7 |
| Conversion after— | | | |
| 48 hours percent | 40 | 39 | 57 |
| 96 hours do | 56 | 58.5 | 73 |

As in Example 1, the monomeric styrene which was added graft copolymerized at 20° C. onto the active centers induced in the initial copolymer by the persulfate at the temperature at which it was active, i.e., 50° C. The results of Runs 1 to 3 indicate that an increased quantity of persulfate led to the formation of a greater number of active centers and therefore a higher conversion of styrene at 20° C.

*Example 3*

This example is also concerned with the graft copolymerization of styrene onto a styrene-butadiene copolymer.

In a three-necked flask fitted with stirrer, reflux condenser, and an inlet tube for the entry of nitrogen, there was placed on a 202 gram portion of the styrene-butadiene copolymer dispersion described in Example 1, 0.99 gram of Dispersol T and 0.4 gram of potassium persulfate. The flask and its contents were deoxygenated by bubbling nitrogen through and then heated to 50° C. and maintained there for 16 hours, the contents of the flask being stirred all the time. Active centers were thus formed in the copolymer.

The flask and its contents were then cooled to 27° C., and a deoxygenated aqueous emulsion of styrene which contained 21.2 grams of styrene, 36.5 grams of water, and 3.3 grams of sodium dodecylbenzenesulfonate was added. The contents of the flask were then stirred for 48 hours at a temperature of 27.5° C. Samples were taken at certain times, and the conversion of styrene was measured as in Example 1. The results were as follows.

Time (hours): Percent styrene polymerized
4 ------------------------------------- 9.6
24.5 ----------------------------------- 61.4
48 ------------------------------------- 67.4

A considerable degree of grafting of the styrene onto the copolymer therefore took place as the reaction was allowed to proceed.

*Example 4*

This example describes the graft copolymerization of styrene onto a styrene-butadiene copolymer that had been cross-linked with divinylbenzene. The styrene-butadiene copolymer used was obtained by the emulsion polymerization in an atmosphere of nitrogen of styrene (85 parts by weight), butadiene (15 parts), and divinylbenzene (1 part) in water (230 parts) using common soap (4 parts) as the dispersing agent and potassium persulfate (0.1 part) as the catalyst. The aqueous dispersion was adjusted to a pH of 9.5–10 by addition of normal sodium hydroxide solution and was then filtered. A sample of the copolymer obtained by drying a portion of the dispersion was found to be 99% insoluble in benzene and was therefore substantially cross-linked.

A 171.4 gram portion of the dispersion, 0.9 gram of Dispersol T, and 0.35 gram of potassium persulfate were placed in a bottle, the mixture was deoxygenated, and the bottle was pressurized with nitrogen and sealed as described in Example 1. Also as described in Example 1, the bottle was agitated in a tumbler for 20 hours at 75° C. and then cooled to 20° C.

18.4 grams of deoxygenated stryene were then added to the contents of the bottle, which was again agitated in the tumbler for 24 hours at 50° C. At the end of this period 54% of the styrene was found to have graft copolymerized onto the active centers induced in the cross-linked copolymer by the preliminary treatment at 75° C. with potassium persulfate.

It was clear that the monomeric styrene had in fact reacted at 50° C. because of the presence of the active centers and not under the influence of the potassium persulfate from the results of an experiment which was carried out as follows:

A bottle containing 197.5 grams of water (the pH of which had been adjusted to 9.5–10), 1 gram of Dispersol T, 0.8 gram of common soap, and 0.4 gram of potassium persulfate was deoxygenated and filled with nitrogen as above. The bottle and its contents were agitated in the tumbler for 20 hours at 75° C. and then cooled to room temperature. 18.7 grams of styrene were added, and agitation was continued for a further 24 hours at 50° C. After this treatment it was found that only 4% of the styrene had polymerized, showing that there was no effective initiator present during the treatment at 50° C.

*Example 5*

This example describes the use of a redox type initiator that decomposed easily.

As described in Example 1, a reaction bottle was filled with the following components: 202.3 grams of the styrene-butadiene copolymer dispersion of Example 1 (pH adjusted to 9.5–10), 1 gram of Dispersol T, 0.5 gram of common soap, 0.4 gram of potassium persulfate, and 0.19 gram of sodium bisulfite. The bottle and contents were agitated in the usual way for 20 hours at 40° C., 18.6 grams of deoxygenated styrene were then added, and agitation was continued for 24 hours at 50° C. At the end of this time 93% of the styrene had graft copolymerized onto the copolymer.

The result of the following blank experiment showed that all of the potassium persulfate/sodium bisulfite initiator must have decomposed during the treatment at 40° C., so that none remained for the period in which the styrene was present at 50° C.

In the usual way, 196.8 grams of water (pH adjusted to 9.5–10), 1 gram of Dispersol T, 0.5 gram of common soap, 0.4 gram of potassium persulfate, and 0.19 gram of sodium bisulfite were sealed in a bottle and heated with agitation for 20 hours at 40° C. 18.3 grams of deoxygenated styrene were then added, and the agitation was continued at 50° C. for 24 hours. At the end of this time none of the styrene had polymerized.

*Example 6*

This example describes the graft copolymerization of butadiene onto a styrene-butadiene copolymer. The styrene-butadiene copolymer used was obtained by emulsion polymerization of styrene (85 parts by weight) and butadiene (15 parts by weight) by the method described in Example 1. The aqueous dispersion was adjusted to a pH of 10 by addition of a normal solution of sodium hydroxide and was then filtered.

A 200 gram portion of the dispersion, 1 gram of Dispersol T, 0.8 gram of common soap, and 0.8 gram of potassium persulfate were placed in a bottle, the mixture was deoxygenated, and the bottle was pressurized with nitrogen to an excess pressure of 7 p.s.i. and sealed as described in Example 1. Also as described in Example 1, the bottle was agitated in a tumbler for 21 hours at 75° C. and then cooled to 20° C. At the end of this time a control experiment showed that substantially all the potassium persulfate had decomposed.

19.4 grams of deoxygenated butadiene were added to the contents of the bottle, which was resealed and agitated in the tumbler at 50° C. Samples of the mixture were taken at intervals, and the percentage of butadiene which had graft copolymerized onto the trunk copolymer was determined as in Example 1.

The results are given below, compared with those obtained in a control experiment carried out as follows:

A bottle containing 200 grams of water (the pH of which had been adjusted to 10), 1 gram of Dispersol T, 0.8 gram of common soap, and 0.8 gram of potassium persulfate was deoxygenated and filled with nitrogen as above. The bottle and its contents were agitated in the tumbler for 21 hours at 75° C. and then cooled to room temperature. 19.0 grams of deoxygenated butadiene were added, and agitation was continued at 50° C. Samples of the mixture were taken at intervals, and the percentage of butadiene which had polymerized was determined as in Example 1.

It was clear from the following results that in the first experiment the monomeric butadiene had in fact reacted at 50° C. because of the presence of active centers in the trunk of the copolymer.

| Reaction Time (hours) | Percent Butadiene Polymerized | |
|---|---|---|
| | Graft Copolymerization | Control |
| 1.0 | 1.1 | 0 |
| 4.3 | 3.3 | 0 |
| 10.8 | 7.9 | |
| 23.7 | 17.3 | 0 |
| 47.0 | 20.8 | 0 |

*Example 7*

This example describes the graft copolymerization of a mixture of styrene and butadiene onto a styrene-butadiene copolymer to give a graft copolymer having excellent physical properties. The reduced "compression set" of the graft copolymer is particularly useful in certain applications.

The styrene-butadiene copolymer used was obtained by emulsion polymerization of styrene (85 parts by weight) and butadiene (15 parts by weight) by the method described in Example 1. The aqueous dispersion, which contained 18% by weight of solid matter, was adjusted to a pH of 9.2 by the addition of a normal solution of sodium hydroxide and was then filtered.

A 100 gram portion of the dispersion, 0.5 gram of Dispersol T, 0.8 gram of common soap, and 0.4 gram of potassium persulfate were placed in a bottle filled with nitrogen and sealed as in Example 1. Also as described in Example 1, the bottle was agitated in a tumbler for 20 hours at 75° C. and was then cooled to 0° C. A deoxygenated mixture of 4.6 grams of styrene and 13.0 grams of butadiene was added to the contents of the bottle, which was then resealed and agitated in the tumbler at 50° C. for 60 hours, after which time 60% of the added monomers had become grafted onto the copolymer.

The resulting latex was coagulated by its addition, with stirring, to a 1% aqueous solution of aluminum potassium sulfate. The coagulated graft copolymer was washed with water and then dried at 45° C. The final graft copolymer had a styrene content of 63% and a butadiene content of 37% by weight.

A rubber composition containing the graft copolymer was prepared by compounding the following components on a laboratory mill.

| Component: | Parts by weight |
|---|---|
| Graft copolymer | 65 |
| Natural rubber (smoked sheets) | 75 |
| Zinc oxide | 3 |
| Stearic acid | 2 |
| Aluminum silicate | 85 |
| Commercial rubber antioxidant | 1.5 |
| Sulfur | 3 |

The stock was vulcanized by heating at 141° C. in a press for 30 minutes to give a sheet of uniform thickness from which test specimens were cut 24 hours after the vulcanization procedure. The specimens were found to possess the following physical properties:

Tensile strength _____kg./cm.$^2$__ 115
Elongation at break _____percent__ 260
Compression set _____do____ 16.7

The tensile strength and elongation at break results were obtained according to British Standard 903, Part A2, 1956. The compression set of the specimen is defined as the difference between the original thickness of the test specimen and the thickness after recovery from deformation by a constant stress for 24 hours, expressed as a percentage of the original thickness; it was obtained by the test method described in British Standard 903, Part A6, 1957.

The above physical properties compare favorably with those which would be possessed by a straight styrene-butadiene copolymer of similar styrene and butadiene contents. The graft copolymer has the particular advantage that the compression set is reduced.

*Example 8*

This example describes the graft copolymerization of styrene onto a styrene-methyl methacrylate trunk copolymer. The styrene-methyl methacrylate trunk copolymer used was one obtained by the emulsion polymerization at 50–70° C. for 9 hours in an atmosphere of nitrogen of styrene (48 parts by weight) and methyl methacrylate (12 parts) in water (140 parts) using a mixture of sodium dodecylbenzenesulfonate (2.4 parts), Dispersol T (0.06 part) and ethylenediamine tetra-acetic acid (0.006 part) as dispersing agents and potassium persulfate (0.06 part) as the catalyst. The resulting dispersion of styrene-methyl methacrylate copolymer had a 30% solids content and a pH of 4.8.

A 100 gram portion of the dispersion, together with sodium dodecylbenzenesulfonate (0.4 gram), Dispersol T (0.5 gram), and potassium persulfate (0.4 gram), was placed in a bottle and deoxygenated by bubbling nitrogen through the mixture for ½ hour, and air in the bottle was then replaced by nitrogen at an excess pressure of 7 p.s.i. The bottle was capped with a self-sealing rubber gasket, agitated in an end-over-end tumbler for 20 hours at 75° C., and then cooled to 20° C.

A control experiment was performed under the same conditions except that 100 grams of water (adjusted to a pH of 3.5) replaced the aqueous dispersion of copolymer.

To each bottle was now added 21.5 grams of styrene which had been previously washed free of inhibitor and deoxygenated by purging with a stream of nitrogen. The bottles were resealed and tumbled for 24 hours at 50° C. At the end of this time the solids content of each resulting dispersion was determined as in Example 1, and from this the amount of added styrene which had polymerized was found.

The results showed that when active centers were induced in the styrene-methyl methacrylate trunk copolymer by means of the persulfate, 20% of the subsequently added styrene became grafted onto the trunk. In the control experiment only about 4% of the styrene was found to have homopolymerized, showing that the persulfate catalyst had been virtually deactivated by the treatment at 75° C. and had not contributed to the graft copolymerization in the first experiment.

What is claimed is:

1. In a method of preparing a graft copolymer by polymerizing a free radical-polymerizable monomer of the group consisting of a monovinylidene aromatic hydrocarbon, a conjugated 1,3-diene, acrylonitrile, methacrylonitrile, a vinyl halide, a vinyl ester of an alkanoic acid, an alkyl methacrylate, and mixtures thereof in an aqueous dispersion of a preformed polymer consisting essentially of a chemically-combined monomer of the group consisting of an alpha-olefin, a monovinylidene aromatic hydrocarbon, acrylonitrile, methacrylonitrile, an alkyl methacrylate, an alkyl acrylate, a conjugated 1,3-diene, and mixtures thereof, the improvement which comprises the steps:
    (a) forming free radicals on the preformed polymer chain, prior to the addition of the free radical-polymerizable monomer, by contacting a peroxy free radical polymerization initiator with the aqueous dispersion of preformed polymer in the absence of oxygen at a temperature at which the initiator decomposes to generate free radicals,
    (b) adding the free radical-polymerizable monomer to the aqueous dispersion at a temperature at which any of said initiator which has not had its free radical-generating capacity completely consumed in step (a) does not generate free radicals, and
    (c) conducting the graft copolymerization of the free radical-polymerizable monomer in the absence of any free radicals other than those which have been formed on the polymer chain in step (a).

2. In a method of preparing a graft copolymer by polymerizing a free radical-polymerizable monomer of the group consisting of a monovinylidene aromatic hydrocarbon, a conjugated 1,3-diene, acrylonitrile, methacrylonitrile, a vinyl halide, a vinyl ester of an alkanoic acid, an alkyl methacrylate, and mixtures thereof in an aqueous dispersion of a preformed polymer consisting essentially of a chemically-combined monomer of the group consisting of an alpha-olefin, a monovinylidene aromatic hydrocarbon, acrylonitrile, methacrylonitrile, an alkyl methacrylate, an alkyl acrylate, a conjugated 1,3-diene, and mixtures thereof, the improvement which comprises the steps:
    (a) forming free radicals on the preformed polymer chain, prior to the addition of the free radical-polymerizable monomer, by contacting a water-soluble persulfate with the aqueous dispersion of preformed polymer in the absence of oxygen at a temperature at which the persulfate decomposes to generate free radicals,
    (b) lowering the temperature of the aqueous dispersion to a temperature at which the persulfate does not generate free radicals, and
    (c) then adding the free radical-polymerizable monomer and conducting the graft copolymerization at this lowered temperature in the absence of any free radicals other than those which have been formed on the polymer chain in step (a).

3. The method of claim 2 in which the free radical-polymerizable monomer is styrene and the preformed polymer is a rubbery polymer of a conjugated 1,3-diene.

4. The method of claim 2 in which the free radical-polymerizable monomer is butadiene and the preformed polymer is a rubbery polymer of a conjugated 1,3-diene.

5. The method of claim 2 in which the free radical-polymerizable monomer is a mixture of butadiene and styrene and the preformed polymer is a rubbery polymer of a conjugated 1,3-diene.

6. The method of claim 2 in which the free radical-polymerizable monomer is styrene and the preformed polymer is a styrene-methyl methacrylate copolymer.

7. In a method of preparing a graft copolymer by polymerizing a free radical-polymerizable monomer of the group consisting of a monovinylidene aromatic hydrocarbon, a conjugated 1,3-diene, acrylonitrile, methacrylonitrile, a vinyl halide, a vinyl ester of an alkanoic acid, an alkyl methacrylate, and mixtures thereof in an aqueous dispersion of a preformed polymer consisting essentially of a chemically-combined monomer of the group consisting of an alpha-olefin, a monovinylidene aromatic hydrocarbon, acrylonitrile, methacrylonitrile, an alkyl methacrylate, an alkyl acrylate, a conjugated 1,3-diene, and mixtures thereof, the improvement which comprises the steps:
    (a) forming free radicals on the preformed polymer chain, prior to the addition of the free radical-polymerizable monomer, by contacting a redox free radical-generating catalyst system with the aqueous dispersion of preformed polymer in the absence of oxygen at a temperature at which the redox system generates free radicals,
    (b) maintaining the aqueous dispersion at this temperature until the free radical-generating capacity of the redox system is completely consumed, and
    (c) then adding the free radical-polymerizable monomer and conducting the graft copolymerization in the absence of any free radicals other than those which have been formed on the polymer chain in step (a).

8. The method of claim 7 in which the free radical-polymerizable monomer is styrene and the preformed polymer is a rubbery polymer of a conjugated 1,3-diene.

9. The method of claim 7 in which the free radical-polymerizable monomer is butadiene and the preformed polymer is a rubbery polymer of a conjugated 1,3-diene.

10. The method of claim 7 in which the free radical-polymerizable monomer is a mixture of butadiene and styrene and the preformed polymer is a rubbery polymer of a conjugated 1,3-diene.

11. The method of claim 7 in which the free radical-polymerizable monomer is styrene and the preformed polymer is a styrene-methyl methacrylate copolymer.

References Cited by the Examiner

UNITED STATES PATENTS

| | | | |
|---|---|---|---|
| 2,755,270 | 7/1956 | Hayes | 260—880 |
| 2,837,496 | 6/1958 | Vandenberg | 260—881 |
| 3,069,382 | 12/1962 | Nikolov et al. | 260—877 |
| 3,088,791 | 5/1963 | Cline et al. | 204—154 |

FOREIGN PATENTS 783,790  10/1957  Great Britain.

MURRAY TILLMAN, *Primary Examiner.*

L. J. BERCOVITZ, *Examiner.*